No. 798,747. PATENTED SEPT. 5, 1905.
F. O'HANLON, J. F. KELLY & H. S. VAUTIER.
ELECTRIC HEATER.
APPLICATION FILED SEPT. 6, 1904.
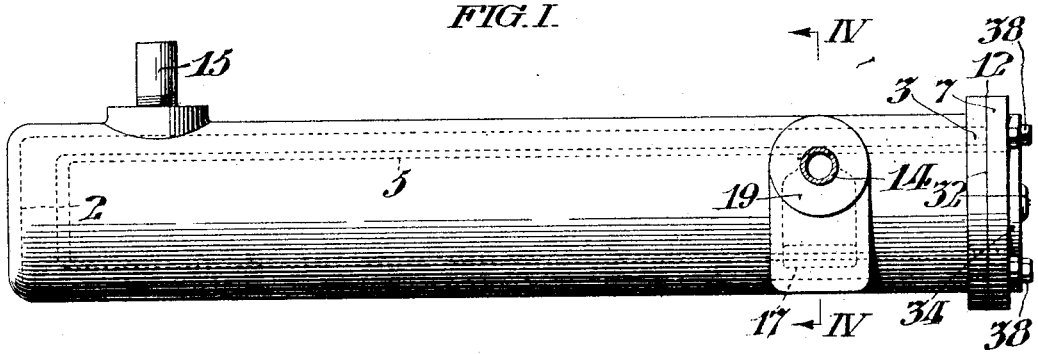
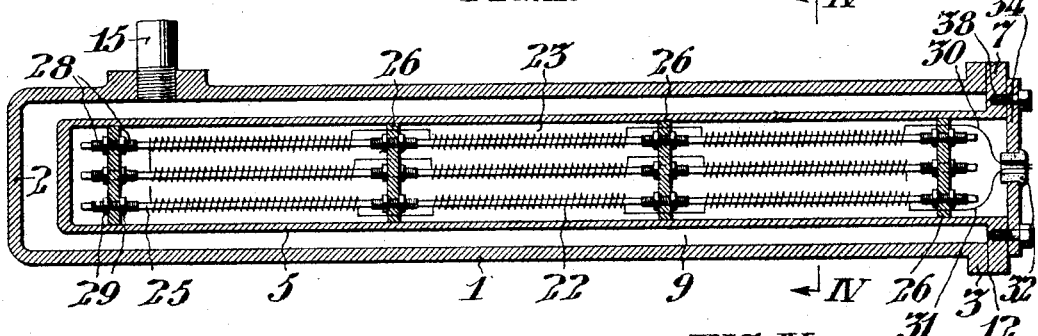
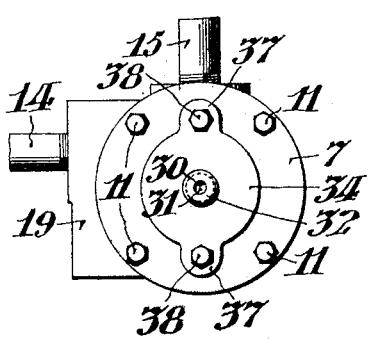
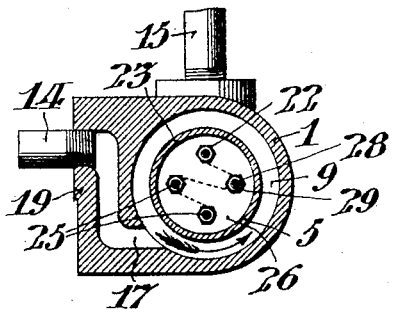
WITNESSES:
Clifton C. Hallowell
John C. Bergner
INVENTORS:
FRANK O'HANLON
JOSEPH F. KELLY
AND
HENRY S. VAUTIER,
By Paige, Paul & Foley,
Attys.

UNITED STATES PATENT OFFICE.

FRANK O'HANLON AND JOSEPH F. KELLY, OF PHILADELPHIA, PENNSYLVANIA, AND HENRY S. VAUTIER, OF CAMDEN, NEW JERSEY.

ELECTRIC HEATER.

No. 798,747.     Specification of Letters Patent.     Patented Sept. 5, 1905.

Application filed September 6, 1904. Serial No. 223,334.

*To all whom it may concern:*

Be it known that we, FRANK O'HANLON and JOSEPH F. KELLY, of Philadelphia, in the State of Pennsylvania, and HENRY S. VAUTIER, of Camden, in the county of Camden and State of New Jersey, have invented certain new and useful Improvements in Electric Heaters, whereof the following is a specification, reference being had to the accompanying drawings.

Our improvements relate to devices for heating liquids, and in the form of our invention hereinafter described the heater is adapted to be included in a water-supply system.

It is an object of our invention to provide a heater with means to insure the maximum extent of traverse of the liquid with respect to the heated surface and in which access to the electric heating device for removal or repair may easily and quickly be had.

To this end our invention comprises a cylindrical outer casing and a cylindrical inner heating-shell concentrically disposed and united by terminal flanges at one end, so as to form an annular water-chamber between them, which is provided with an inlet and outlet, the former being preferably arranged to meet the water-chamber tangentially, thus tending to create a spiral flow of the liquid through the chamber.

As hereinafter described, said inner shell contains an electric heating device comprising an insulating-frame conveniently formed of metal rods coated with porcelain and held in separate relation by a series of insulating-disks through which the rods extend. Said rods support coils of wire of low electric conductivity having supply-conductors extending through a cap-plate, which closes the flanged end of the inner shell.

Our invention comprises the various novel features of construction and arrangement hereinafter more definitely specified.

In the drawings, Figure I is a side elevation of a heater conveniently embodying our improvements. Fig. II is a central longitudinal sectional view of said heater. Fig. III is an elevation of the right-hand end of said heater as indicated in Figs. I and II. Fig. IV is a transverse sectional view taken on the line IV IV in Figs. I and II.

In said figures, 1 is the outer casing, having the integral wall 2 at one end and surrounding terminal flange 3 at the other end. The cylindrical heating-shell 5 is mounted in concentric relation with said casing 1 and has a similar terminal flange 7 overlapping the flange 3 on said casing, thus closing the annular chamber 9 between said casing and shell. Said terminal flanges 3 and 7 are conveniently secured in liquid-tight relation by the bolts 11, which are entered through them and through the gasket 12.

The outer casing 1 is provided with the supply-pipe 14 and discharge-pipe 15, and, as shown in Fig. IV, the liquid-inlet comprises the port 17, tangentially disposed with respect to the chamber 9 in the boss 19, which latter is conveniently formed integral with the casing 1. The arrangement described is such that the liquid introduced through said port 17 enters the chamber 9 in the direction of the arrow indicated in Fig. IV, tending to circulate spirally around said shell 5 in said chamber 9 before its escape at the outlet 15. Such an arrangement insures the maximum transference of heat to the liquid from said shell 5.

The inner or heating shell 5 is closed by a cap-plate 34, covering the entire end of the cylinder. It is heated by an electric current in the wire coils 22, which are conveniently supported in the chamber 23 in said shell 5 on the rods 25. Said rods 25 may be of porcelain-coated metal or other suitable insulating material and are rigidly held in separate relation by the disks 26, being provided with screw-threads 28 to receive the nuts 29, which engage said disks upon their opposite sides, as indicated in Fig. II. Said coils 22 are connected in series relation and supplied with current by the conductors 30 and 31, extending through the insulating-bushing 32 in the cap-plate 34, which closes the end of said chamber 23 in the shell 5. As shown in Fig. III, said cap-plate is provided with lugs 37 to receive the screws 38, by which it is secured to the flange 3.

It will be observed that upon removing the cap-plate 34 the heating-coils, with their supporting-frame, including the rods 25 and disks 26, may be slid out of the inner shell for purposes of inspection or repair, and this may be accomplished without interference with any of the water-tight joints of the apparatus.

It is to be understood that we do not desire to limit ourselves to the precise details of construction and arrangement herein set forth, as various modifications may be made therein without departing from the essential features of our invention.

We claim—

1. In an electric heater for liquids, the combination of a cylindrical outer casing provided with a surrounding terminal flange; a smaller cylindrical inner shell provided with a similar terminal flange; the two being concentrically united by the attachment of their flanges, with provision of an annular liquid-chamber between them; and an electrical heating device contained within the inner shell, substantially as set forth.

2. In an electric heater for liquids, the combination of a cylindrical outer casing closed at one end and provided with a surrounding terminal flange at the other; a shorter cylindrical inner shell similarly closed at one end and provided with an overlapping terminal flange at the other; the two being concentrically united by the attachment of their flanges with provision of a liquid-chamber between both their sides and their closed ends; an inlet and outlet for said liquid-chamber situated respectively near different ends thereof; and an electrical heating device contained within the inner shell, substantially as set forth.

3. In an electric heater for liquids, the combination of a cylindrical outer casing closed at one end and provided with a terminal surrounding flange at its open end; an inner and smaller cylindrical shell closed at one end and provided with an overlapping terminal flange at its open end; the two being concentrically united by the attachment of their flanges with provision of an annular liquid-chamber between them; heating devices contained within the inner shell; and a removable cap-plate covering the entire open end of the inner cylinder, substantially as set forth.

4. In an electric heater for liquids, the combination of two cylinders both provided with surrounding terminal flanges; one of said cylinders being smaller than the other but provided with an overlapping flange by which it is united to the other with provision of an annular circulatory chamber between them; heating devices within the inner shell; a tangentially-arranged inlet near one end of the annular chamber; and an outlet near the other end of said annular chamber, substantially as set forth.

5. In an electric heater for liquids, the combination of two concentric cylinders with an annular liquid-chamber between them; a heating device contained within the inner cylinder comprising a set of insulated rods supported at intervals by disks resting within said inner cylinder; and heating-coils mounted on said rods, substantially as set forth.

6. In an electric heater for liquids, the combination of two concentric cylinders, the one within the other and both provided with contiguous terminal flanges by which they are united with provision of an annular liquid-chamber between them; a removable cap-plate covering the open end of the inner cylinder; an electric heating device within said inner cylinder; and electrical connections for said heating device passing through the cap-plate, substantially as set forth.

7. In an electric heater for liquids, the combination of two concentric cylinders, the one within the other, and both provided at one end with contiguous terminal flanges by which they are united with provision of an annular liquid-chamber between them; a removable cap-plate covering the open end of the inner cylinder; an electrical heating device contained within the inner cylinder and comprising heating-coils, with disks and rods whereby they are supported; and a removable cap-plate covering the entire end of said inner cylinder by the removal of which its interior is wholly exposed to the withdrawal of the heating device, substantially as set forth.

8. In an electric heater, the combination with an outer cylindrical tubular casing, having one end closed in integral relation with its side and having a circumferential flange at the opposite end; an inner cylindrical tubular shell having one end closed in integral relation with its side; a circumferential flange at the opposite end of said shell, overlapping the flange on said casing in concentric relation therewith, and forming an annular liquid-chamber between said shell and casing; a gasket between said flanges; bolts securing said flanges in liquid-tight relation; an inlet-boss in said casing; an outlet-boss in said casing; an inlet-port extending in said inlet-boss in tangential relation with said chamber; a coil of electric conductor in the chamber inclosed by said shell; an insulating-support for said coil comprising a plurality of disks; screw-threaded rods extending through said disks; nuts on said rod securing said rods and disks in rigid relation; a cap-plate closing the flanged end of said shell; an insulating-bushing in said cap-plate; and, supply-conductors extending through said bushing in connection with said coil, substantially as set forth.

In testimony whereof we have hereunto signed our names, at Philadelphia, in the State of Pennsylvania, this 3d day of September, 1904.

FRANK O'HANLON.
JOSEPH F. KELLY.
HENRY S. VAUTIER.

Witnesses:
JAMES H. BELL,
E. L. FULLERTON.